(12) United States Patent
Zhou et al.

(10) Patent No.: US 8,154,992 B2
(45) Date of Patent: Apr. 10, 2012

(54) SYSTEM AND METHOD FOR GRACEFUL RESTART

(75) Inventors: Junlan Zhou, Sunnyvale, CA (US);
Zhengrong Ji, Sunnyvale, CA (US);
Yuguang Wu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 12/539,124

(22) Filed: Aug. 11, 2009

(65) Prior Publication Data
US 2011/0038255 A1    Feb. 17, 2011

(51) Int. Cl.
*H04J 1/16* (2006.01)

(52) U.S. Cl. ........ 370/219; 370/220; 370/236; 370/242; 370/244

(58) Field of Classification Search .......... 370/217, 370/218, 220, 235, 236, 219, 242, 244, 245
See application file for complete search history.

(56) References Cited

U.S. PATENT DOCUMENTS

| | | | | |
|---|---|---|---|---|
| 7,292,535 B2 * | 11/2007 | Folkes et al. | ................ | 370/238 |
| 7,406,030 B1 * | 7/2008 | Rijsman | ........................ | 370/216 |
| 7,406,037 B2 * | 7/2008 | Okita | ............................ | 370/218 |
| 7,715,307 B2 * | 5/2010 | Walton et al. | ................ | 370/216 |
| 7,739,403 B1 * | 6/2010 | Balakrishna et al. | ......... | 709/242 |
| 7,940,650 B1 * | 5/2011 | Sandhir et al. | ................ | 370/219 |
| 8,009,556 B2 * | 8/2011 | May | .............................. | 370/238 |
| 2003/0218982 A1 * | 11/2003 | Folkes et al. | .................. | 370/238 |
| 2004/0008700 A1 | 1/2004 | Visser et al. | | |
| 2005/0050136 A1 | 3/2005 | Golla | | |
| 2006/0072480 A1 | 4/2006 | Deval et al. | | |
| 2008/0082630 A1 * | 4/2008 | Molotchko et al. | ........... | 709/218 |
| 2009/0129261 A1 * | 5/2009 | Visser et al. | ................... | 370/219 |

FOREIGN PATENT DOCUMENTS
EP    1365551 A1    11/2003

OTHER PUBLICATIONS

International Search Report and Written Opinion, PCT/US2010/044983, dated Apr. 18, 2011.

* cited by examiner

*Primary Examiner* — Ricky Ngo
*Assistant Examiner* — Dewanda Samuel
(74) *Attorney, Agent, or Firm* — Lerner, David, Littenberg, Krumholz & Mentlik, LLP

(57) ABSTRACT

A system for maintaining routing capabilities in a router having a failed control plane provides an active control plane in the router in communication with at least one external node, the active control plane running at least one routing process. A backup control plane may be interconnected with the active control plane, so that the active control plane may periodically transmit synchronization signals to the backup control plane. The backup control plane may update its state based on these synchronization signals. Moreover, the backup control plane may be programmed to take over the routing process of the active control plane if the active control plane fails.

14 Claims, 10 Drawing Sheets

SYSTEM AND METHOD FOR GRACEFUL RESTART

BACKGROUND OF THE INVENTION

Many computer networks, including the Internet, may establish connections between a source and a destination through one or more routers. These routers may operate according to one of a variety of protocols, most commonly Border Gateway Protocol (BGP), Exterior Gateway Protocol (EGP), Intermediate-System to Intermediate-System (ISIS), Link Aggregation Control Protocol (LACP), Open Shortest Path First (OSPF), or Routing Information Protocol (RIP).

On occasion, a router may fail, thereby causing a disruption in the flow of data between the source and the destination. While this connection may often be repaired as the failed router restarts, it nevertheless results in a delay of transmission of the data. Sometimes, it may even result in a loss of data. Current technology may provide for a seamless restart of a router if the outage of that router is announced. For example, during a planned outage of a BGP node (e.g., during a software upgrade), that node may announce its "restart" before the event occurs. Upon receiving this announcement, peer BGP nodes may plan for the outage by preserving outgoing data packets until a connection with the restarted node is reestablished.

Some network routers may have one active control plane and one inactive control plane. The active control plane may run different processes, including routing modules, such as BGP. When the active control plane fails unexpectedly, these processes can "fail over" to the inactive control plane. However, for example, according to the current BGP standard, all remote BGP peers of the failed control plane will lose their transmission control protocol ("TCP") connection with the failed control plane, and detect that the BGP session is down. As a result, BGP routes must be re-computed, BGP routing updates must be generated, significant delay occurs, and data may be lost.

BRIEF SUMMARY OF THE INVENTION

One aspect of the invention provides a router comprising a primary control plane running one or more routing processes, and a secondary control plane interconnected with the primary control plane. The primary control plane may periodically transmit synchronization signals indicating its forwarding state to the secondary control plane. In turn, the secondary control plane may update its state based on those synchronization signals.

This router may in some instances include a plurality of secondary control planes. The primary control plane and the plurality of secondary control planes may form a ring topology, wherein each control plane establishes a TCP connection to a downstream neighbor and the synchronization messages are transmitted individually through each control plane in the ring. In the event that the primary control plane fails, its next available downstream neighbor may take over its routing processes. Alternatively, the primary control plane may transmit the synchronization messages simultaneously to each secondary control plane. In the event that the primary control plane fails, a first one of the plurality of secondary control planes initiates an election process to elect a secondary control plane to take over as a new primary control plane. The secondary control plane that initiates the election process may be the same secondary control plane that detects a failure of the primary control plane.

Another aspect of the invention provides a method for managing routing connections in a router having an active control plane in communication with at least one external node, and a plurality of backup control planes. According to this method, the active control plane may periodically transmit synchronization signals to the plurality of backup control planes. If the active control plane fails, such failure may be detected by, for example, one of the backup control planes. Accordingly, one of the backup control planes may be elected to serve as a new active control plane. Communication between the new active control plane and the at least one external node may be established, the new active control plane and the at least one external node may synchronize.

Yet another aspect of the invention provides a system for maintaining routing capabilities in a router having a failed control plane. This system may comprise an active control plane in the router in communication with at least one external node, the active control plane running at least one routing process. A backup control plane may be interconnected with the active control plane, so that the active control plane may periodically transmit synchronization signals to the backup control plane. The backup control plane may update its state based on these synchronization signals. Moreover, the backup control plane may be programmed to take over the routing process of the active control plane if the active control plane fails.

DETAILED DESCRIPTION

Figure 1:
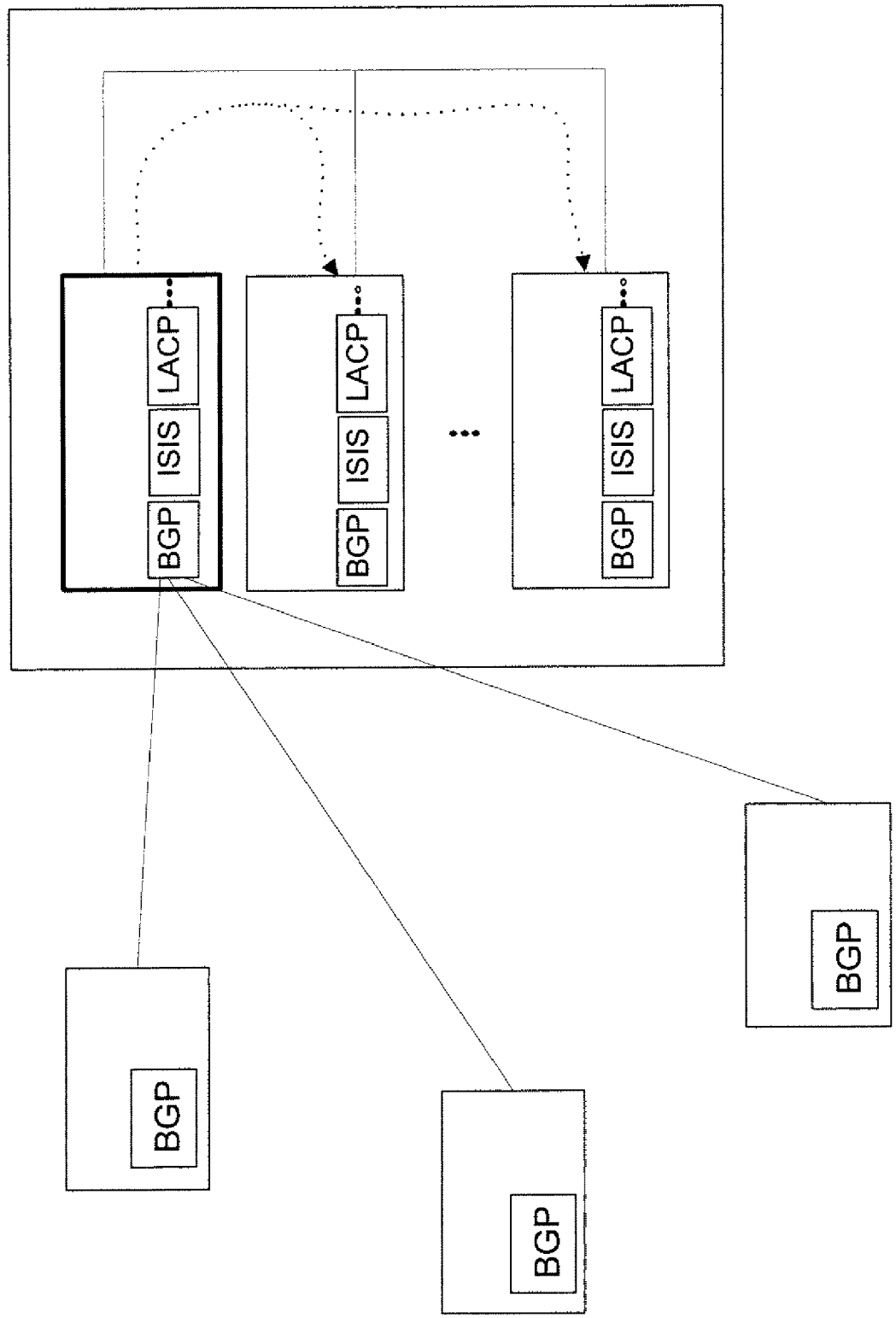
FIG. 1 is a system diagram according to an aspect of the invention.

FIG. 1 shows a router 100 in accordance with an aspect of the invention. The router 100 includes control planes 110, 120, 130. At any time, one of the control planes 110-130 may serve as the "active" plane, while the other control planes serve as "backup" planes. The control planes 110-130 may be interconnected by any means, for example, a high speed interconnect.

According to the example shown in FIG. 1, central plane 110 serves as the active control plane, and control plane 120, 130 serve as backups. Each control plane 110, 120, 130 may run one or more routing processes and may have different routing modules. For example, as shown in FIG. 1, the active control plane 110 runs at least BGP, ISIS, and LACP. Similarly, the backup control planes 120, 130 are capable of running the same processes. For purposes of this example, the embodiment is described with respect to BGP routing protocol. However, it should be understood that the described system and method may be used in connection with any routing protocol.

In communication with the router 100, and particularly with the active control plane 110, are one or more peer routers 150, 160, 170. These peer routers 150-170 may also run one or more processes. For example, the BGP processes of the router 100 may establish BGP sessions 155, 165, 175 with the BGP processes of the peer routers 150-170.

As further shown in FIG. 1, the active control plane 110 transmits state synchronization messages 104 to the backup control planes 120, 130. These state synchronization messages 104 provide the backup control planes 120, 130 with updates regarding a forwarding state of the active control plane 110. For example, the synchronization messages may include information regarding data received from peer routers 150-170 and data to be transmitted to peer routers 150-170. According to one aspect, each synchronization message 104 may have a corresponding sequence number. In this respect, backup control planes 120, 130 may determine if they have missed any synchronization messages from the active control plane 110 by comparing sequence numbers of a received message with the number of previous messages. If, for example, a backup control plane 120-130 determines that it has received a message with a sequence number out of sequence, that may be an indication that the active control plane 110 has failed.

Figure 2:
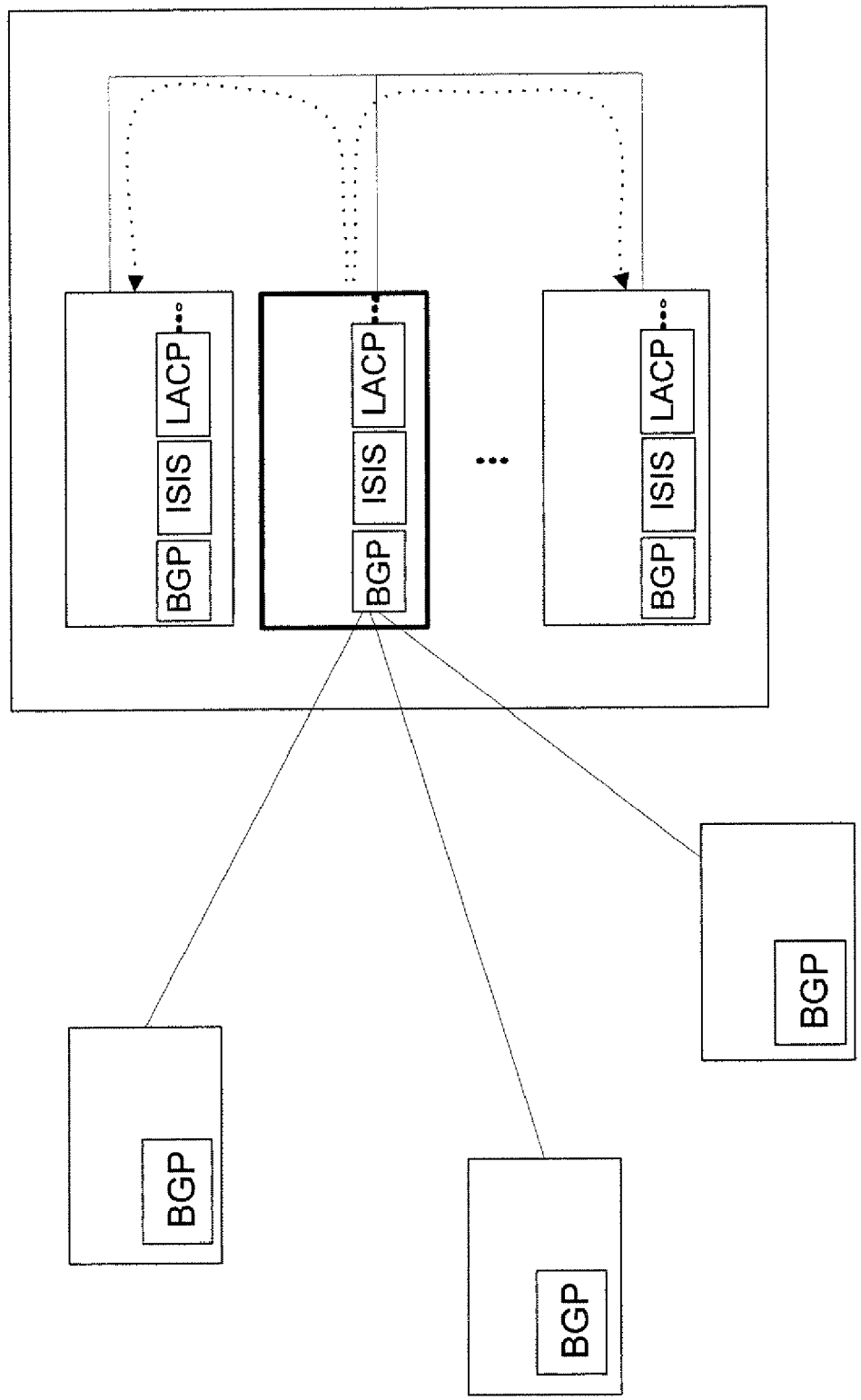
FIG. 2 is a system diagram according to another aspect of the invention.

FIG. 2 shows router 200 according to another aspect of the invention, i.e., when an active control plan, e.g., control plane 210, fails. Accordingly, backup plane 220 may take over as the active control plane while control plane 210 recovers from its failure to serve as a backup control plane. Control plane 230, which previously served as a backup, may continue to serve as a backup. The new active control plane 220, connected to the backup planes 210, 230 by interconnect 202, sends state synchronization messages 204, 206 to the respective backup planes 210, 230. Additionally, new active control plane 220 establishes sessions with peer BGP routers 250, 260, and 270.

Figure 3:
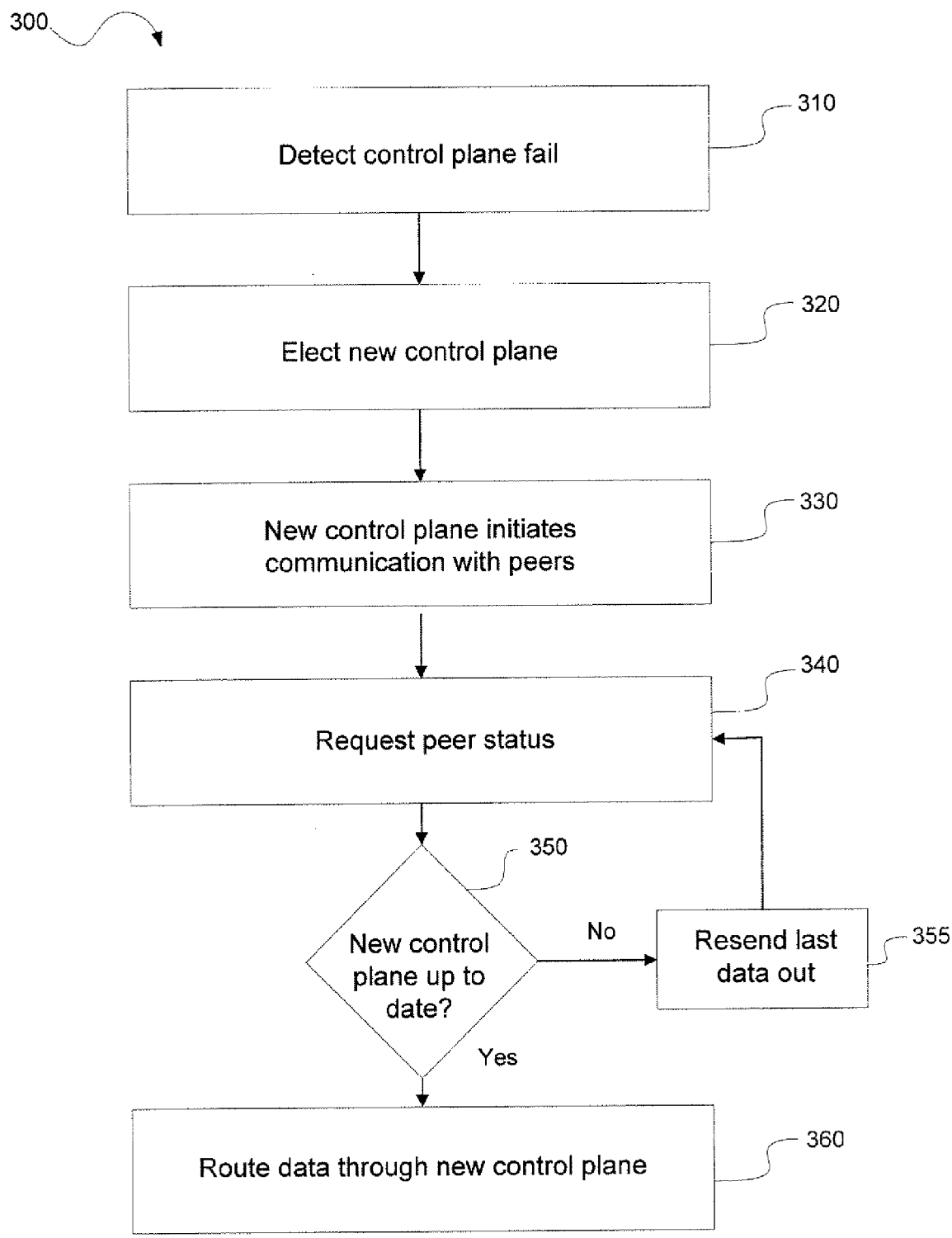
FIG. 3 is a flow diagram of a process for failing over according to an aspect of the invention.

FIG. 3 shows a method 300 of taking over the processes of a failed active control plane, such as the plane 210. This method 300 may be performed by one or more backup planes, such as the backup plane 220. According to this method, the backup control plane detects that the active control plane has failed (block 310), and then determines a new control plane. The new control plane establishes communication with peer routers (block 330), synchronizes, and begins routing data.

In block 310, the backup control plane detects that the active control plane has failed. For example, the backup control plane may recognize that it has not received a signal from the active control plane for a predetermined amount of time. The signal may be a state synchronization message, such as the message 104 of FIG. 1, or any other type of signal periodically transmitted by the active control plane. Upon recognizing that is has not received such signals, the backup control plane may transmit a request for signals to the active control plane. If a complete snapshot of the active plane's forwarding status is not received in response to this request, the backup plane can be assured that the active control plane has failed, and that the connection between the two planes was not merely interrupted.

A new control plane may take over for the failed control plane in block 320. Because several backup planes may be present in the router having the failed plane, the backup plane which will take over for the failed plane may either be predetermined or may be selected by the backup planes at the time of failure. For example, a "next-in-command" backup plane may be preselected based upon any number of criteria, such as the topology of the interconnected backup planes. This method will be described in further detail in connection with FIGS. 7-10. Alternatively, for example, the backup plane which first detects failure of the active plane may nominate itself as the new active plane and request approval from the other backup planes. This method of determining the new active plane will be discussed in further detail in connection with FIGS. 5-6.

The new active control plane may initiate communication with its peer routers in block 330, and request the status from each peer in block 340. The status of the peers enables the new active control plane to determine if it is in synch with the peers in block 350. For example, if the routers are running BGP processes, the new active plane determines whether its "Adj-RIB-In" message/information matches the "Adj-RIB-Out" of the router from which it is receiving information. Similarly, using the same example, the new active control plane also determines if its Adj-RIB-Out matches the Adj-RIB-In of the router to which it is forwarding information.

If the new active control plane is not in synch with one or more of its peers, data is resent as shown in block 355. The particular data sent and the entity sending the data may depend on the direction of information flow and/or which entity is lacking the most up to date information. For example, using the BGP example mentioned above, if the new active control plane determined that its Adj-RIB-In does not match the Adj-RIB-Out of the router from which it receives information, that router will resend its Adj-RIB-Out to the new active control plane. In this regard, the new active control plane has the most up to date information output from the router. Similarly, if the new active control plane determines that its Adj-RIB-Out does not match the Adj-RIB-In of the router to which it is forwarding information, the new active control plane may resend its Adj-RIB-Out. Therefore, that router will have the most up to date information passing through the new active control plane.

Once it is determined that the new active control plane is up to date, the router (e.g., the router 200 of FIG. 2) including the new active control plane (220) may continue to route information.

Figure 4:
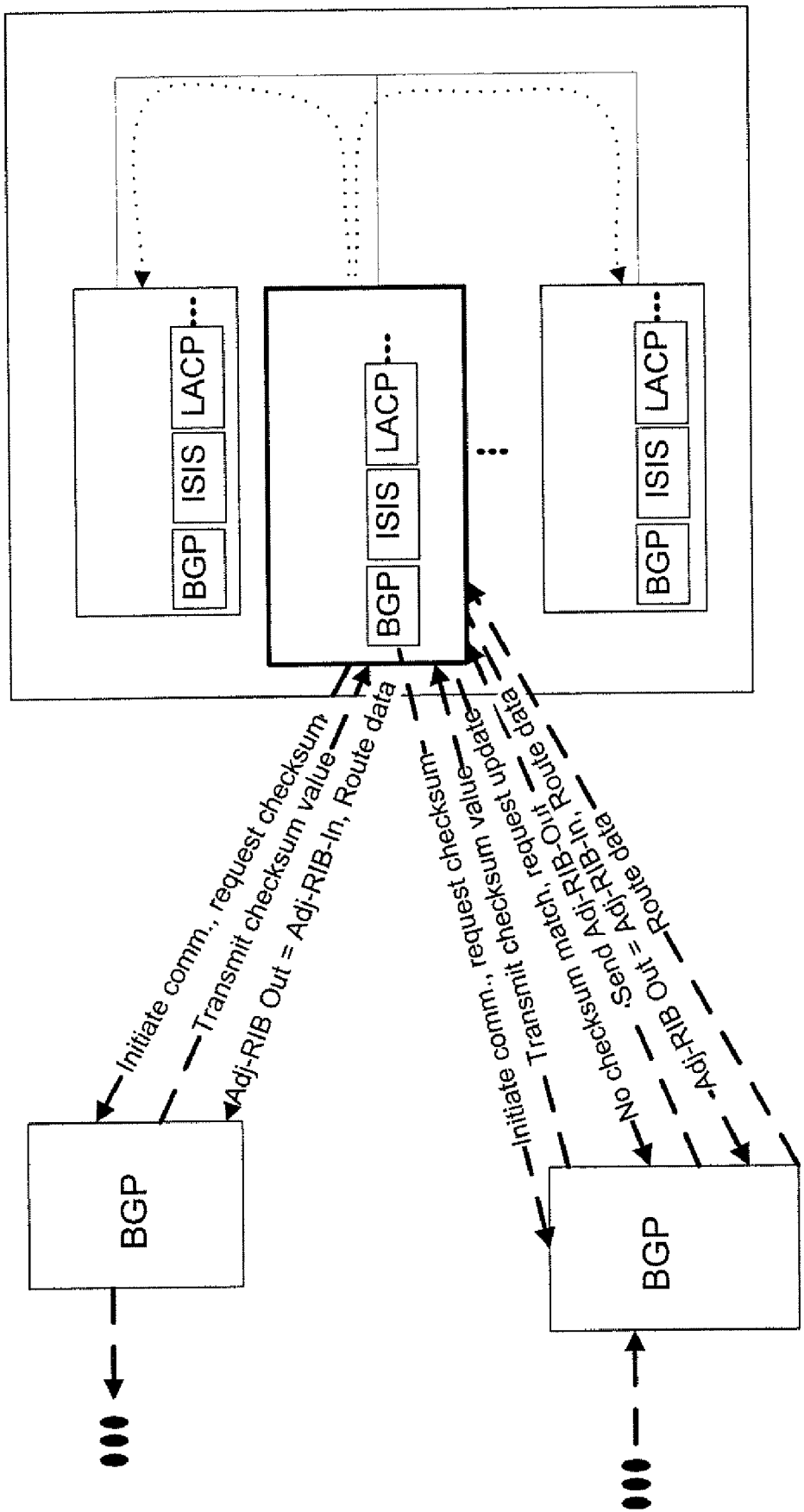
FIG. 4 is a system diagram corresponding to the process flow diagram of FIG. 3.

FIG. 4 shows a diagram providing details on the exchange of information between a new active control plane 420 and its peer routers 450 and 470 when the new active control plane 420 has been elected to take over for a failed control plane 410. This example relates particularly to routers running BGP processes, but it should be understood that the communication exchange may be performed in relation to other processes with only minor modification.

As shown in FIG. 4, a route is established from the router 470 to the router 400 to the router 450. For example, data may flow to the router 470 from a source node or another router (not shown) via connection 476. Once this data passes through the router 400 to the router 450, it may continue to a destination node or another router (not shown) via connection 456. However, if a control plane fails, such as control plane 410, a new active control plane 420 must take over to continue this routing. In order to perform this takeover, or "fail-over", the new active control plane 420 initiates communication with peer routes 450, 470.

The new active control plane 420 may initiate communication with each peer router 450, 470. For example, a BGP router may pre-assign a TCP port number for each control plane 410, 420, 430. The BGP process on the control plane 420 uses its assigned TCP port to establish a new TCP session to the remote BGP peers 450, 470. For example, the router 400 may advertise the list of TCP port numbers to the remote BGP peers 450, 470 in an "OPEN" message. The "OPEN" message, described in greater detail following this example, may also indicate to the peer routers 450, 470 that the router 400 is capable of "graceful restart," i.e., failing over to a backup control plane as described herein.

According to an alternative aspect, where TCP port numbers are not pre-assigned, a separate user datagram protocol ("UDP") based control channel may be established between the back-up BGP processes and each remote BGP peer 450, 470. The new active BGP process 420 may thus use this channel to announce the fail-over. Accordingly, the remote BGP peers 450, 470 receiving this announcement may initiate a new BGP session with the new active BGP process 420.

In initiating communication with its peers 450, 470, the new active control plane 420 may request a checksum. The checksum may be a value corresponding to the most recent information received at or transmitted by the router 450, 470. For example, it may be a value indicative of the contents of an Adj-RIB-In of the router 450, or a value indicative of the Adj-RIB-Out of the router 470.

In response to this request, the peer routers 450, 470 may transmit their checksum values to the router 400, and particularly to the new active control plane 420. The new active control plane 420 compares the checksums from the peer routers 450, 470 to its own checksum to determine if it is up to date. Accordingly, the new active control plane 420 will either determine that its checksum matches the peer, such as shown in the exchange with the router 450, or the new active control plane 420 may determine that there is a mismatch, as shown in the exchange with peer router 470.

In the event that the checksum from the router 450 matches the checksum of the new active control plane 420, the new active control plane may establish a BGP process with the router 450. Moreover, the router 400 may continue routing data to the peer router 450.

In the event that the checksum of the router 470 and the new active control plane 420 do not match, the new active control plane 420 may request an update from the peer router 470. The update provided by the router 470 may be the last information transmitted by the router, or some combination of information already transmitted and information ready to be transmitted. For example, the router 470 may send to the new active control plane 420 the contents of its Adj-RIB-Out.

Upon receiving the update provided by the peer router 470, the new active control plane 420 may update its processes and establish a BGP session with the router 470. Accordingly, the router 470 may continue to route data through the router 400.

According to one aspect, it is possible that a remote peer 450 or 470 detects that the BGP session is down before the fail-over of backup BGP processes, (i.e., the takeover by the new active control plane 420) completes. If the TCP port numbers of backup BGP process are pre-assigned, the remote BGP peers 450, 470 may wait for the new active control plane 420 to initiate a new BGP session from one of these pre-assigned ports. Alternatively, the remote peers 450, 470 may wait for a "fail-over" announcement from the UDP control channel, and initiate a new BGP session with the new active control plane 420. In both cases, the remote peers 450, 470 may preserve their forwarding states for a predefined duration. Therefore, the router continues to forward packets during the fail-over of BGP process.

According to one aspect, the "OPEN" message sent by the router 400 may include the following syntax to announce its graceful failover capability:

---
Fail-over Timer in seconds (12 bits)
Backup BGP process port list length (1 octet)
Backup BGP process port list (16 bits * Number of Backup BGP processes)

---

"Fail-over Timer in seconds" is the estimated duration of the fail-over of a BGP process on a router (e.g., the router 400). This can be used to speed up routing convergence by peers 450, 470 in case no backup BGP processes are available on the router 400 after the failure of active BGP process. For example, if a new active control plane 420 does not take over and reestablish connections with peer routers 450, 470 within 12 seconds, it may be determined that none of the backup planes 420, 430 are available to take over for the failed active plane 410. Accordingly, the router 00 may shut down and a new route may be determined between peer routers 470 and 450.

"Backup BGP process port list" specifies the list of TCP port numbers assigned to the BGP processes running on the BGP speaker. The number of TCP port numbers is specified in "Backup BGP process port list length." If the "Backup BGP process port list length" is 0, the remote BGP peer is required to notify the BGP speaker of a UDP port number of the control channel to receive an announcement of fail-over and a TCP port number of new active BGP process.

To set up a UDP control channel between a BGP speaker supporting graceful failover and a remote BGP peer, the remote BGP peer replies to the "OPEN" message of BGP router advertising graceful failover capability with a "NOTIFICATION" message. For example, if the open message received from a backup control plane 420 indicates a capability of graceful restart, the remote routers 450, 470 may transmit the following notification message:

---
Error Code = 7 (8 bits)      Error Subcode = 0 (8 bits)
control channel UDP port number (16 bits)

---

"Control channel UDP port number" is the UDP port number for the sender of notification message to receive a fail-over announcement.

Figure 5:
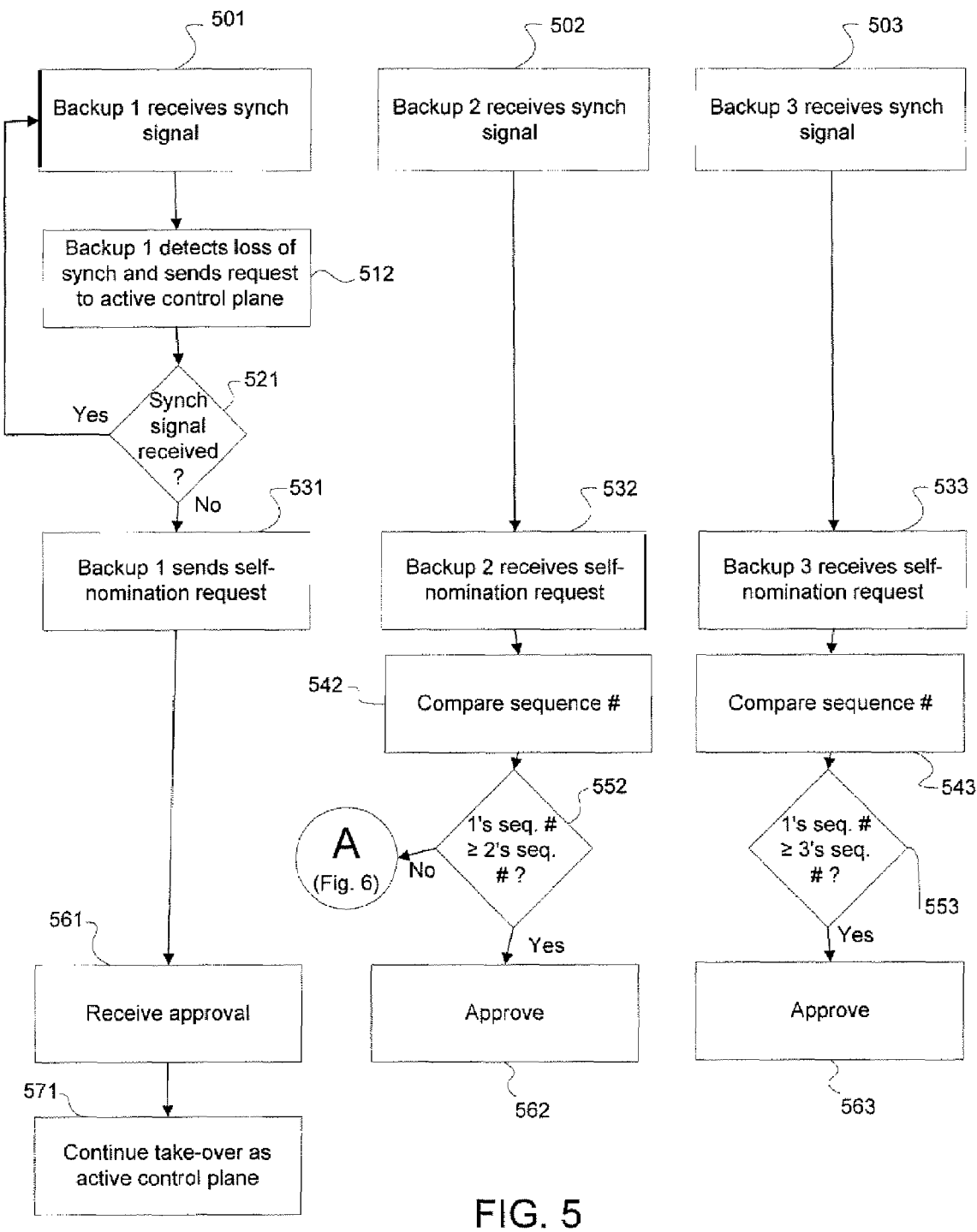
FIG. 5 is a diagram of a process for determining which backup plane will take over as an active plane, according to an aspect of the invention.

FIG. 5 provides a flow diagram 500 of a process for determining which of several backup planes will take over as a new active plane in the event that the active plane fails. As shown in FIG. 5, the backup planes 1, 2, 3 may operate in parallel. Accordingly, backup planes 1, 2, and 3 shadow the states of an active control plane as they receive state synchronization messages in blocks 501, 502, and 503 respectively. These state synchronization messages may be periodically transmitted by the active control plane associated with these backup planes 1, 2, and 3, and may thus provide updated information on the forwarding state of the active control plane.

According to one aspect, each synchronization message may be sent with a corresponding numeric value. For example, the numeric value of the first synchronization message may be "0", and the next "1" and so on. For ease of description in this example, a numeric value indicative of the synchronization state of a backup plane will be referred to as a "sequence number." According to one aspect, each synchronization message is assigned a 64-bit sequence number, and includes all of the state changes of the active protocol process since the last synchronization, and further includes a timestamp. The sequence number may start from "0" and increment until it reaches ($2^{64}-1$), at which point it may start again from "0".

In block 512, the backup plane 1 detects a loss of synchronization. For example, the backup plane 1 may recognize that it has not received a synchronization message within a predetermined period of time. Alternatively, the backup plane 1 may detect a gap in the sequence numbers of two consecutive synchronization messages. Accordingly, the backup control plane 1 may transmit a request to the active control plane seeking a synchronization message providing a complete snapshot of the active control plane 1's forwarding state. If such synchronization message is received in response to this request, the process returns to block 501. However, if a synchronization message is still not received in block 21, the backup plane 1 may nominate itself as the new active plane.

Each control plane 1, 2, 3, may listen at a pre-configured user datagram protocol (UDP) port for messages from the other control planes. Accordingly, the backup plane 1 may broadcast a request for approval (block 531), and that request may be received by backup planes 2, 3. The backup plane 1 may also send an indication of its synchronization state, such as the last sequence number it received, either along with its request for approval or in response to a request from the other backup planes 2, 3.

Upon receiving backup plane 1's request in blocks 532, 533, the backup planes 2, 3 may compare the synchronization state of the backup plane 1 with their own backup states. Thus, for example, in block 542 the backup plane 2 compares the sequence number of backup plane 1 with its own sequence number. If plane 1's sequence number indicates that plane 1 received the same or more recent updates than plane 2 (e.g., if plane 1's sequence number is greater than or equal to plane 2's sequence number), backup plane 2 will approve plane 1's self-nomination (block 562). Similarly, if backup plane 3 determines that backup plane 1 has the most recent updates in block 553, it will also approve plane 1's self-nomination in block 563. The backup plane 1 receives such approvals in block 561 and may thus continue to take over as the new active control plane.

Figure 6:
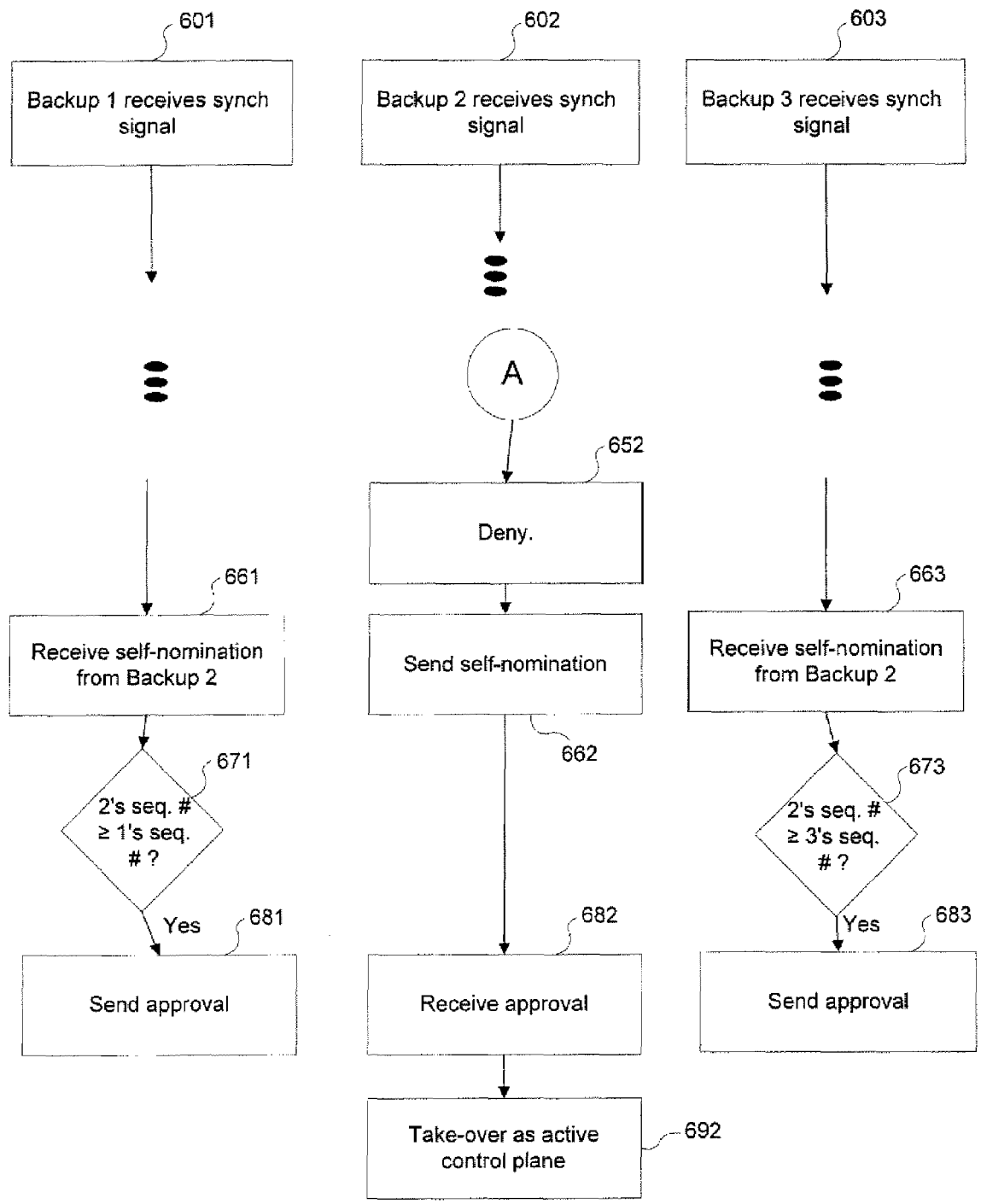
FIG. 6 is a diagram of a process for determining which backup plane will take over as an active plane, according to an aspect of the invention.

However, it may not always be the case that the self-nominating backup plane has the highest sequence number. Accordingly, FIG. 6 illustrates a process 600 which may occur if, for example, backup plane 1's sequence number was less than backup plane 2's sequence number in block 552.

In block 652, the backup plane 2 denies the backup plane 1's request for approval. Further, the backup plane 2 sends out its own self-nomination approval request in block 662. The other backup planes 1, 3 receive this request in blocks 661, 663. The backup planes 1, 3, may also receive the update status of the backup plane 2 by, for example, receiving 2's sequence number. Accordingly, backup plane 1 and backup plane 3 may compare 2's sequence number with their own sequence numbers (blocks 671, 673). As shown in FIG. 6, each of backup planes 1, 3 determines that backup plane 2 has the most recent synchronization and sends an approval (blocks 681, 683). The backup plane 2 receives this approval (block 682) and takes over for the failed active plane in block 692.

In the previous examples, the active control plane broadcasts state synchronization messages to all backup control planes. According to another aspect of the present invention, the active control plane may perform delegation-based state synchronization. In this regard, the active control plane may ensure reliable delivery of the state synchronization messages to the backup planes.

Figure 7:
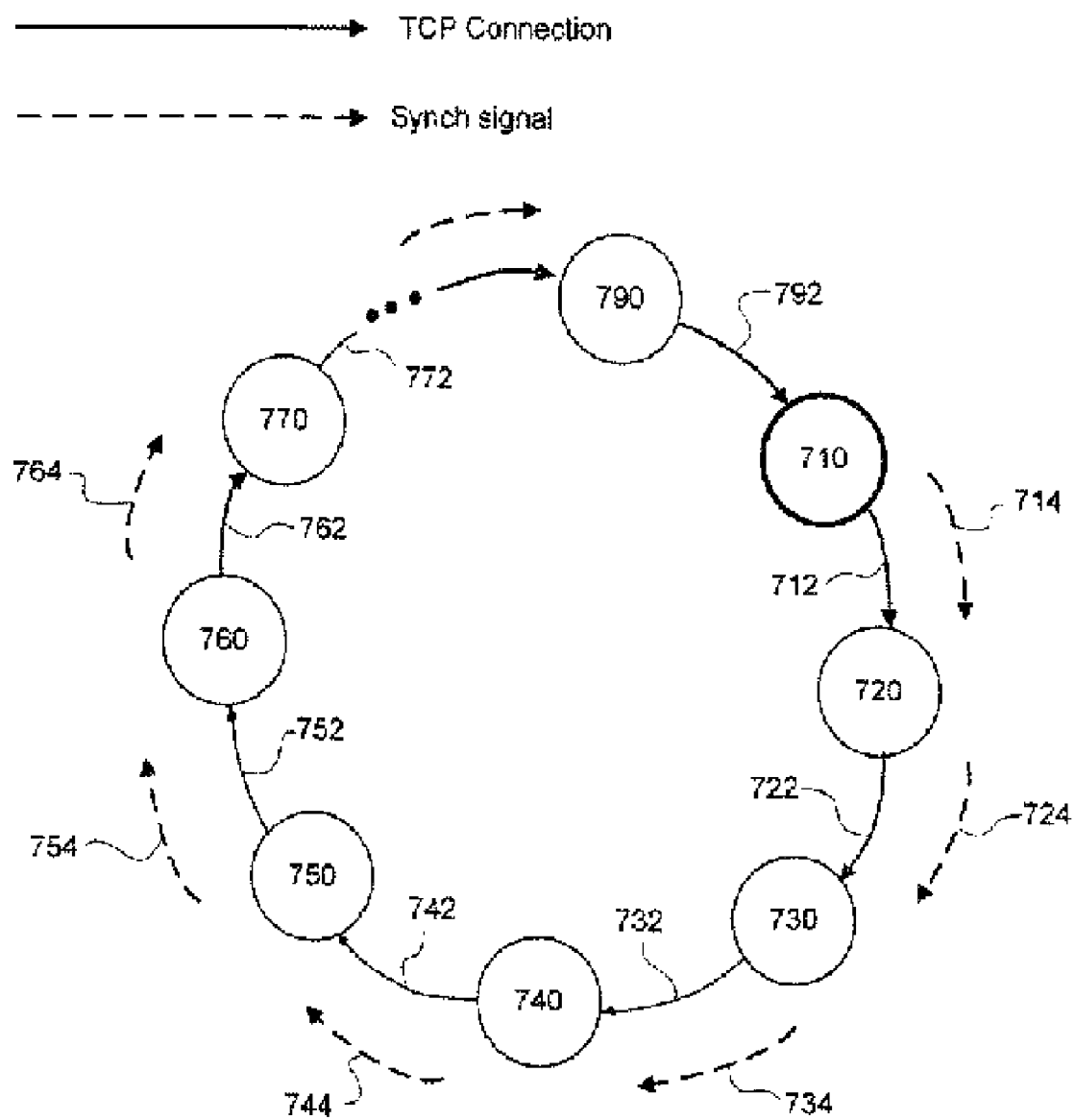
FIG. 7 is a system diagram according to another aspect of the invention.

FIG. 7 illustrates an example of delegation based state synchronization. In this example, control plane 710 is the active control plane, and control planes 720-790 are the backup control planes. The control planes 710-790 form a delegation ring based on, for example, identifications, and each node forms a transmission control protocol (TCP) connection with its adjacent node. For example, plane 790 forms a TCP connection 792 with plane 710, which forms a TCP connection 712 with plane 720, and so on. The active node 710 may initiate a state synchronization message 714, which is transmitted to the downstream backup node 720. The backup plane 720 may use the message 714 to update its state to shadow the protocol processes of active node 710. The backup node 720 further transmits the synchronization message downstream to the backup node 730, which uses the synchronization message to update its shadow state. This forwarding of the synchronization message initiated by the active node 710 continues clock-wise around the ring until it reaches the last backup plane in the ring, in this case backup 790. While backup node 790 forms a TCP connector 792 with active node 710, there is no need for the backup node 790 to forward the synchronization message to the node 710 because the node 710 generates such signals.

Figure 8:
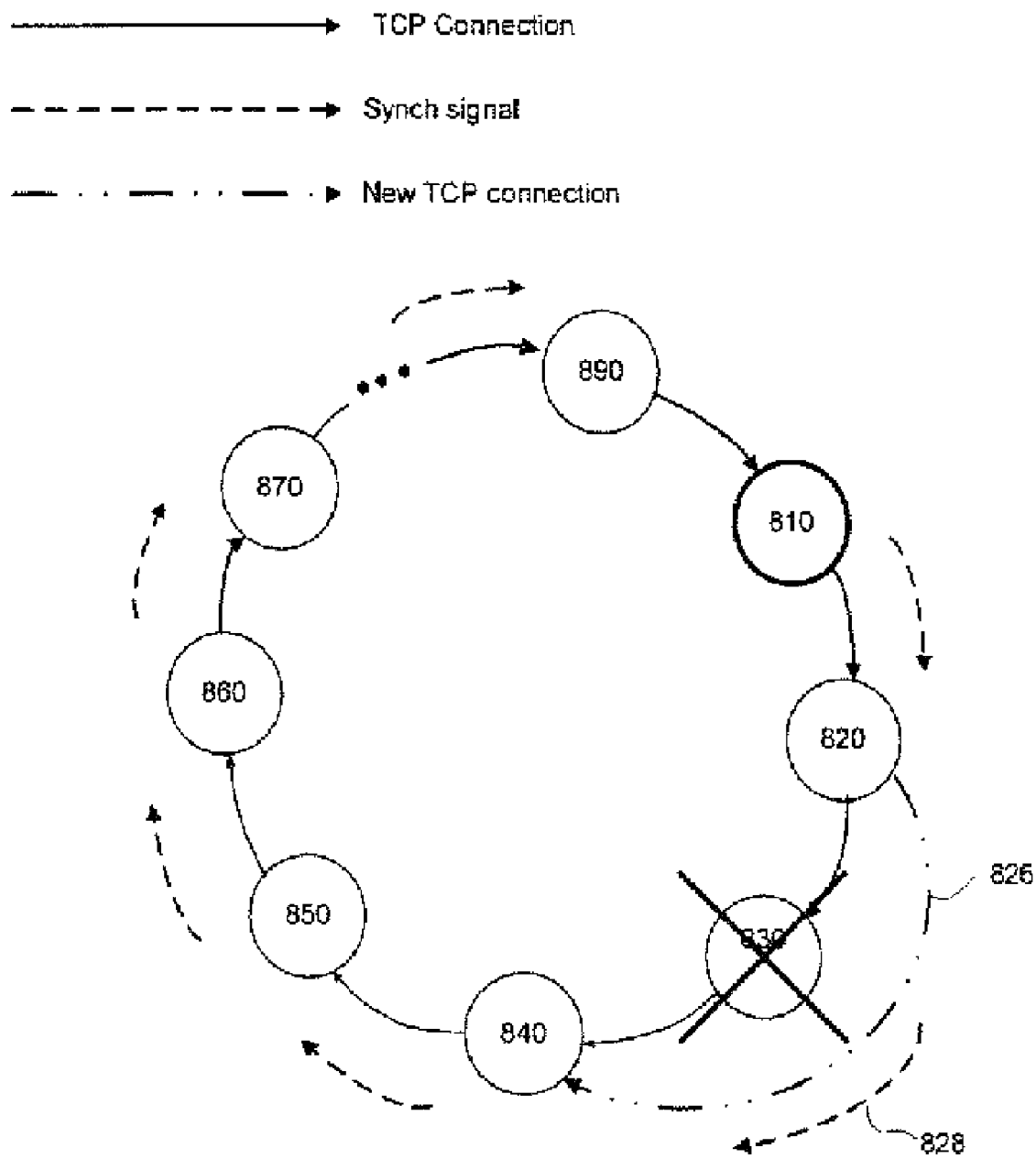
FIG. 8 is a diagram of a system having a failed backup plane according to the aspect of FIG. 7.

FIG. 8 illustrates an example of delegation based state synchronization, wherein one of the backup planes fails. Particularly, in this example backup control plane 830 fails. Its failure maybe detected by either its upstream neighbor node, backup plane 820, or its downstream neighbor node, backup plane 840. For example, backup plane 820 may detect that synchronization messages forwarded to the backup plane 830 are not being received (e.g., the backup plane 820 does not receive an acknowledgement packet within a predetermined period of time). The backup plane 840 may also detect that it has not received a synchronization message within a predetermined period of time, or that the last synchronization message sequence number skipped one or more values in the sequence. Accordingly, backup plane 820 or backup plane 840 may initiate a repair. For example, backup plane 820 may establish a new TCP connection 826 with backup plane 840, thereby skipping over the failed backup plane 830. Thus, the backup plane 820 may send synchronization messages 828 directly to the backup control plane 840.

Figure 9:
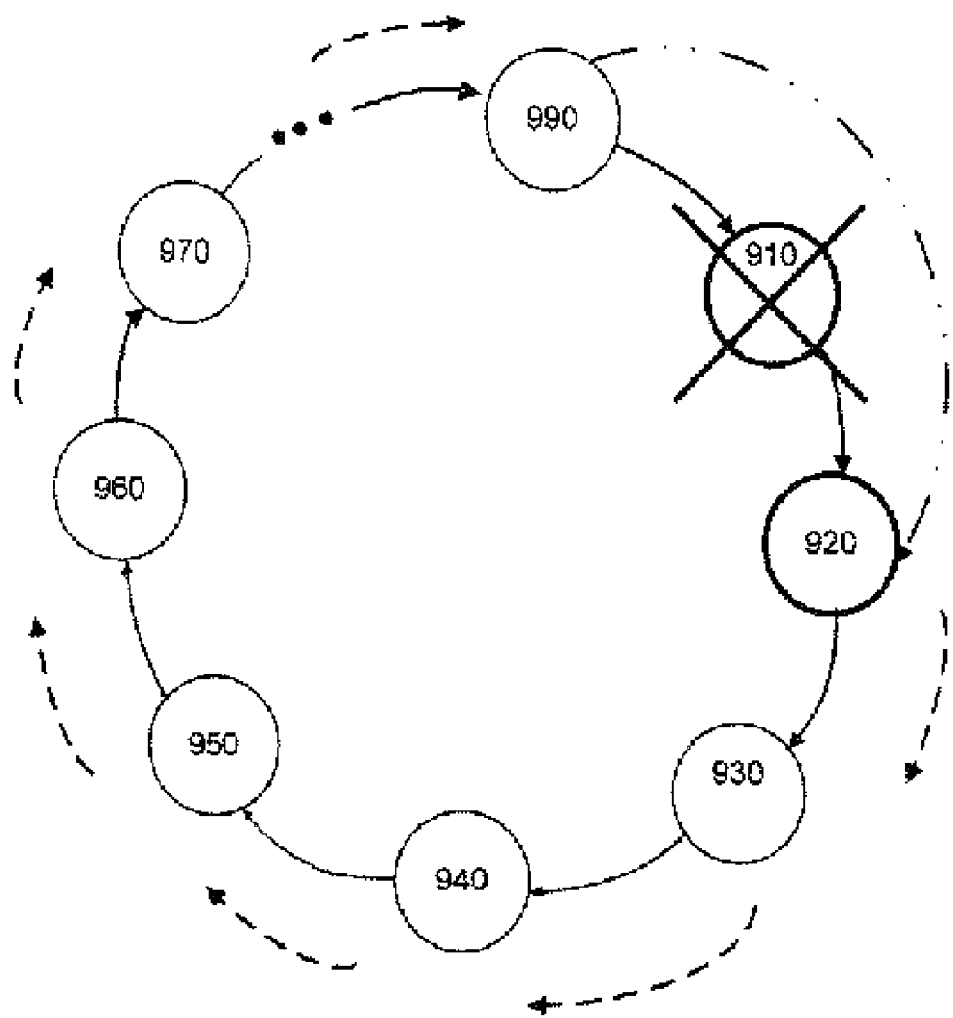
FIG. 9 is a diagram of a system having a failed active plane according to FIG. 7.

FIG. 9 illustrates an example of delegation based state synchronization, wherein active control plane 910 fails. Similar to the example above, one or both of backup control planes 990, 920 may detect the failure and repair the TCP connection. For example, the backup control plane 990 may initiate a TCP connection directly with backup control plane 920, thereby skipping over the failed active control plane 910. However, in this scenario a new active control plane must be elected to take over the processes of the failed active plane 910.

According to one aspect, the new active control plane in the delegation ring may be the immediate downstream neighbor of the failed active control plane. Because this ring topology ensures that each backup control plane 920-990 receives the state synchronization messages in clock-wise order, the immediate downstream neighbor 920 of the failed active control plane 910 always has the most up to date information, thereby making it a prime candidate for taking over as the new active control plane. Accordingly, in this example the backup control plane 920 would serve as the new active control plane for the failed active plane 910.

The backup control plane 920 may recognize that an upstream active control plane 910 has failed if it has stopped receiving state synchronization messages from the active plane 910, or if it receives a new TCP connection request from a node upstream of the active node 910, such as backup node 990. Accordingly, the backup control plane 920 may establish itself as the new active control plane and take over the processes of the failed active plane 910.

Figure 10:
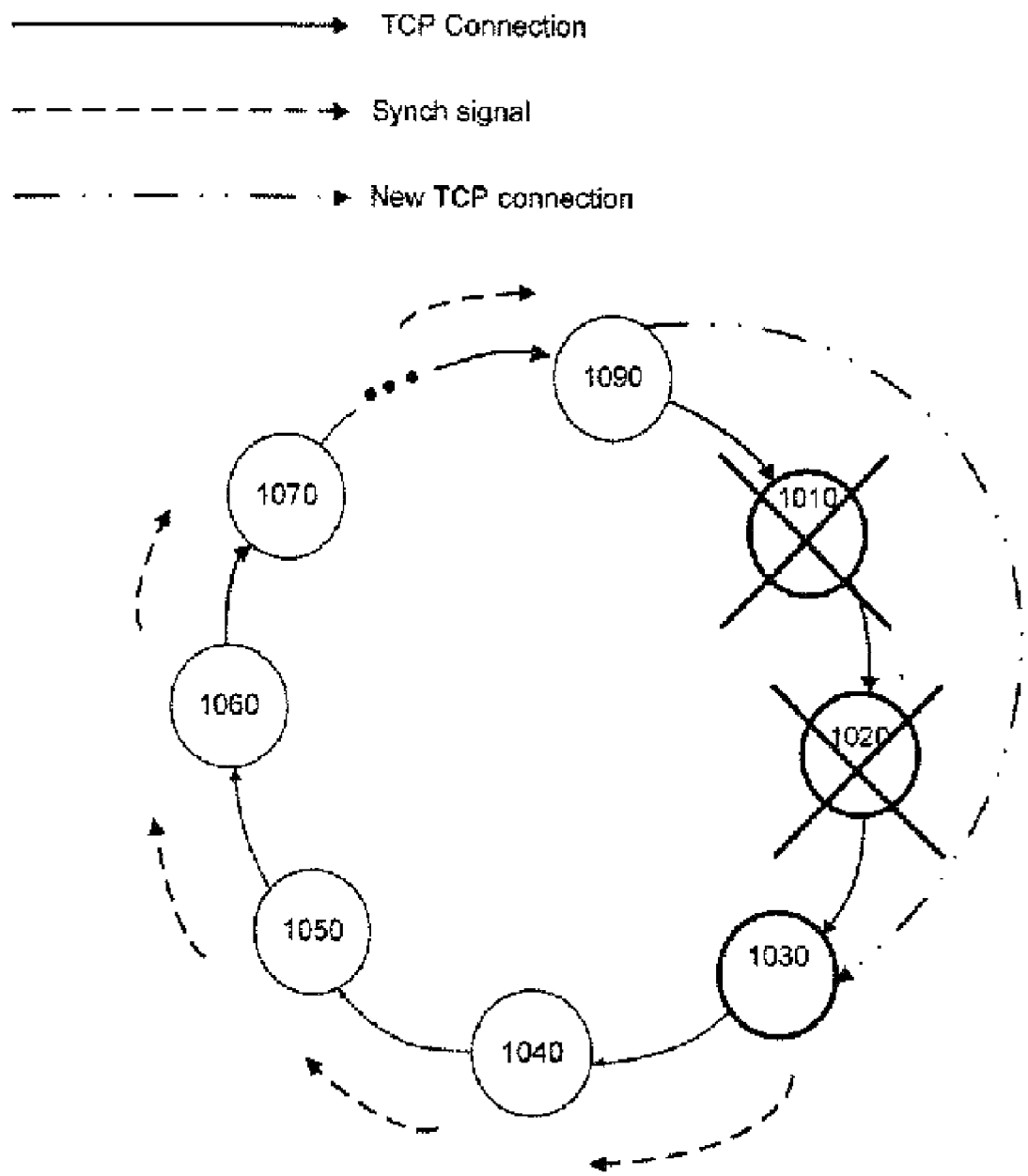
FIG. 10 is a diagram of a system having a failed backup plane and a failed active plane according to FIG. 7.

FIG. 10 illustrates an example of delegation based state synchronization, wherein the active plane and one of the backup planes fails. Particularly, in this example active plane 1010 and neighboring backup plane 1020 have both failed. Accordingly, backup control plane 1030 will stop receiving synchronization messages. Backup plane 1030 may detect this error and work to repair a connection with an upstream node. Alternatively or additionally, backup plane 1090 may detect that its downstream neighbor, active plane 1010, has failed and work to repair the connection in the ring. Accordingly, backup plane 1090 may establish a TCP connection with the next available downstream neighbor, backup plane 1030, thereby skipping over the failed nodes 1010, 1020.

In addition to repairing the TCP connection, one of the backup planes 1030-1090 must also serve as the new active control plane. Backup plane 1030, being the next functioning downstream neighbor of the failed control plane 1010, may recognize that it is to become the new active control plane. For example, upon receiving the TCP connection request from a node 1090 upstream of the failed active plane 1010, the backup plane 1030 may activate as the new active control plane and take over the processes of the failed active plane 1010. Thus, new active control plane 1030 will generate synchronization messages to be transmitted to its downstream neighbor, backup plane 1040. Additionally, new active control plane 1030 may perform the routing processes for the ring, and establish connection with peer routers.

Although the present invention has been described with reference to particular embodiments, it should be understood that these examples are merely illustrative of the principles and applications of the present invention. For example, while the present invention has been described above largely with respect to BGP processes, it should be understood that the described system and method may be used in connection with any of a number of different routing protocols, such as ISIS, LACP, RIP, etc. Moreover, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments and that other arrangements may be devised without departing from the spirit and scope of the present invention as defined by the appended claims.

The invention claimed is:

1. A router, comprising:
a primary control plane running one or more routing processes;
a secondary control plane interconnected with the primary control plane;
wherein the primary control plane periodically transmits synchronization signals indicating a forwarding state of the primary control plane to the secondary control plane, and the secondary control plane updates its state based on the synchronization signals;
wherein the synchronization signals are transmitted with a corresponding sequence number and the secondary control plane is capable of detecting that it did not receive a signal based on the sequence number of a received signal; and
wherein in the event that the primary control plane fails, the secondary control plane:
  takes over the routing processes of the primary control plane;
  establishes communication with at least one external node;
  synchronizes with the at least one external node, the synchronizing comprising:
    comparing a checksum value of the at least one external node with a checksum value of the secondary control plane; and
    retransmitting data between the external node and the secondary control plane if the checksum values do not match.

2. The router according to claim 1, wherein the secondary control plane is capable of detecting failure of the primary control plane.

3. A router, comprising:
a primary control plane running one or more routing processes;
a plurality of secondary control planes interconnected with the primary control plane
in a ring topology, wherein each control plane is connected to a downstream neighbor;
wherein:
the primary control plane periodically transmits synchronization signals indicating a forwarding state of the primary control plane to the secondary control planes;
the secondary control planes update their states based on the synchronization signals;
the synchronization messages are transmitted individually through each control plane in the ring; and
in the event that the primary control plane fails, its next available downstream neighbor:
  takes over the routing processes of the primary control plane;
  establishes communication with at least one external node;
  synchronizes with the at least one external node, the synchronizing comprising:
    comparing a checksum value of the at least one external node with a checksum value of the next available downstream neighbor; and
    retransmitting data between the external node and the next available downstream neighbor if the checksum values do not match.

4. A router, comprising:
a primary control plane running one or more routing processes;
a plurality of secondary control planes interconnected with the primary control plane;
wherein:
the primary control plane is serially connected to each secondary control plane;
wherein the primary control plane periodically transmits synchronization signals indicating a forwarding state of the primary control plane to the secondary control plane;
the secondary control planes update their state based on the synchronization signals;
the synchronization messages are simultaneously transmitted to each secondary control plane; and
in the event that the primary control plane fails, a first one of the plurality of secondary control planes initiates an election process to elect a secondary control plane to take over as a new primary control plane, the election process comprising:
  transmitting a nomination approval request from the first one of the plurality of secondary control planes to the other backup control planes;
  transmitting a first value representing a synchronization state of the secondary control plane;

comparing the first value at each other backup control plane with a second value indicative of that other backup control plane's synchronization state;

transmitting an approval message from each other backup control plane to the first one of the plurality of secondary control planes if the first value is greater than or equal to the second value.

5. The router according to claim 1, wherein the one or more routing processes implement a Border Gateway Protocol (BGP).

6. The router according to claim 1, wherein each of the control planes has a preassigned Transmission Control Protocol (TCP) port number used to establish communication with remote peers.

7. A method for managing routing connections in a router having an active control plane in communication with at least one external node, and a plurality of backup control planes, the method comprising:
periodically transmitting synchronization signals from the active control plane to the plurality of backup control planes;
detecting a failure of the active control plane;
electing a first one of the backup control planes to serve as a new active control plane;
establishing communication between the new active control plane and the at least one external node;
synchronizing the new active control plane with the at least one external node, the synchronizing comprising:
comparing a checksum value of the at least one external node with a checksum value of the new active control plane; and
retransmitting data between the external node and the new active control plane if the checksum values do not match.

8. The method according to claim 7, wherein detecting the failure of the active control plane is performed by one of the backup control planes.

9. The method according to claim 8, wherein electing the first one of the backup control planes further comprises transmitting a self-nomination approval request from the backup control plane detecting the failure to the other backup control planes.

10. A method for managing routing connections in a router having an active control plane in communication with at least one external node, and a plurality of backup control planes, the method comprising:
periodically transmitting synchronization signals from the active control plane to the plurality of backup control planes;
detecting a failure of the active control plane;
electing a first one of the backup control planes to serve as a new active control plane, the electing comprising:
transmitting a self-nomination approval request from the backup control plane detecting the failure to the other backup control planes;
transmitting with the self-nomination approval request a first value representing a synchronization state of the backup control plane detecting the failure;
comparing the first value at each other backup control plane with a second value indicative of that other backup control plane's synchronization state;
transmitting an approval message from each other backup control plane to the backup control plane detecting the failure if the first value is greater than or equal to the second value;
establishing communication between the new active control plane and the at least one external node; and
synchronizing the new active control plane with the at least one external node.

11. A method for managing routing connections in a router having an active control plane in communication with at least one external node, and a plurality of backup control planes, the active control plane and the plurality of backup control planes arranged in a ring topology, the method comprising:
periodically transmitting synchronization signals from the active control plane to the plurality of backup control planes, wherein the synchronization messages are individually transmitted downstream from the active control plane through each of the backup control planes;
detecting a failure of the active control plane;
electing a first one of the backup control plane's to serve as a new active control plane, the electing comprising selecting a next available downstream backup plane;
establishing communication between the new active control plane and the at least one external node; and
synchronizing the new active control plane with the at least one external node, the synchronizing comprising:
comparing a checksum value of the at least one external node with a checksum value of the new active control plane; and
retransmitting data between the external node and the new active control plane if the checksum values do not match.

12. The method according to claim 7, wherein establishing communication between the new active control plane and the at least one external node includes transmitting an open message from the new active control plane to each external node.

13. A system for maintaining routing capabilities in a router having a failed control plane, comprising:
an active control plane in the router in communication with at least one external node, the active control plane running at least one routing process;
a backup control plane interconnected with the active control plane;
wherein the active control plane periodically transmits synchronization signals to the backup control plane, and the backup control plane updates its state based on the synchronization signals;
wherein the backup control plane is programmed to take over the routing process of the active control plane if the active control plane fails;
wherein the at least one node external to the router includes a peer router; and
wherein the backup control plane establishes a connection with the peer router in response to determining that the active control plane has failed;
wherein the backup control plane synchronizes with the peer router, the synchronizing comprising:
comparing a checksum value of the peer router with a checksum value of the backup control plane; and
retransmitting data between the peer router and the backup control plane if the checksum values do not match.

14. A system for maintaining routing capabilities in a router having a failed control plane, comprising:
an active control plane in the router in communication with at least one external node, the active control plane running at least one routing process;
a plurality of backup control planes interconnected with the active control plane, each backup control plane programmed to determine which backup control plane should take over in the event of a failure of the active control plane;
wherein the active control plane periodically transmits synchronization signals to the backup control planes, and the backup control planes updates their states based on the synchronization signals;

wherein each backup control plane is programmed to take over the routing process of the active control plane if the active control plane fails; and wherein in the event that the active control plane fails, a first one of the plurality of backup control planes initiates an election process, the election process comprising:

transmitting a self-nomination approval request from the first one of the plurality of backup control planes to the other backup control planes;

transmitting with the self-nomination approval request a first value representing a synchronization state of the first one of the plurality of backup control planes;

comparing the first value at each other backup control plane with a second value indicative of that other backup control plane's synchronization state;

transmitting an approval message from each other backup control plane to the first one of the plurality of backup control planes if the first value is greater than or equal to the second value.

\* \* \* \* \*

UNITED STATES PATENT AND TRADEMARK OFFICE
CERTIFICATE OF CORRECTION

| | |
|---|---|
| PATENT NO. | : 8,154,992 B2 |
| APPLICATION NO. | : 12/539124 |
| DATED | : April 10, 2012 |
| INVENTOR(S) | : Junlan Zhou, Zhengrong Ji and Yuguang Wu |

It is certified that error appears in the above-identified patent and that said Letters Patent is hereby corrected as shown below:

In the Claims:

At column 12, line 14, "plane's" should read --planes--.

Signed and Sealed this
Thirtieth Day of July, 2013

Teresa Stanek Rea
*Acting Director of the United States Patent and Trademark Office*